(12) United States Patent
Fardid et al.

(10) Patent No.: US 12,126,510 B2
(45) Date of Patent: *Oct. 22, 2024

(54) SYSTEMS AND METHODS FOR OVER-THE-AIR UPDATE SCHEDULING OF SMART DEVICES BASED ON SIGNAL QUALITY AND DEVICE AVAILABILITY METRICS

(71) Applicant: Verizon Patent and Licensing Inc., Basking Ridge, NJ (US)

(72) Inventors: Reza Fardid, Sunnyvale, CA (US); Boyu Wang, Menlo Park, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 199 days.

This patent is subject to a terminal disclaimer.

(21) Appl. No.: 18/051,068

(22) Filed: Oct. 31, 2022

(65) Prior Publication Data

US 2023/0085224 A1  Mar. 16, 2023

Related U.S. Application Data

(63) Continuation of application No. 17/188,792, filed on Mar. 1, 2021, now Pat. No. 11,539,603.

(51) Int. Cl.
| | | |
|---|---|---|
| *H04L 43/0811* | (2022.01) | |
| *G06F 8/65* | (2018.01) | |
| *H04B 17/373* | (2015.01) | |
| *H04B 17/382* | (2015.01) | |
| *H04L 67/00* | (2022.01) | |

(52) U.S. Cl.
CPC ........... *H04L 43/0811* (2013.01); *G06F 8/65* (2013.01); *H04B 17/373* (2015.01); *H04B 17/382* (2015.01); *H04L 67/34* (2013.01)

(58) Field of Classification Search
None
See application file for complete search history.

(56) References Cited

U.S. PATENT DOCUMENTS

| | | |
|---|---|---|
| 8,301,176 B1 | 10/2012 | Yellin et al. |
| 2017/0178080 A1* | 6/2017 | Abebe .................. G06F 16/383 |
| 2017/0180736 A1* | 6/2017 | Yang .................... H04N 19/164 |
| 2018/0097899 A1* | 4/2018 | A .......................... H04L 67/535 |

(Continued)

OTHER PUBLICATIONS

Arakadakis, et al., "Firmware over-the-air programming techniques for IoT networks—A survey", Sep. 17, 2020 (available at https://arxiv.org/abs/2009.02260, visited Mar. 1, 2021).

(Continued)

*Primary Examiner* — Liem H. Nguyen

(57) ABSTRACT

A system described herein may provide a technique for generating one or more predictive models of device availability, which may be used to predict whether a given device will be able to be reached via one or more networks to receive information, such as Over-the-Air ("OTA") updates. The predictive models may be based on, for example, radio frequency ("RF") metrics, device availability metrics, and timing offsets between times associated with such RF metrics and availability metrics. For a given device, based on RF metrics associated with the device and further based on a candidate time, the predictive model may be used to determine whether the device will be available at the candidate time.

20 Claims, 10 Drawing Sheets

(56) References Cited

U.S. PATENT DOCUMENTS

| | | | |
|---|---|---|---|
| 2019/0278581 A1* | 9/2019 | Miller | G06F 8/65 |
| 2019/0319868 A1* | 10/2019 | Svennebring | H04W 24/08 |
| 2019/0349858 A1 | 11/2019 | Jantzi et al. | |
| 2021/0201333 A1* | 7/2021 | Rachamadugu | H04L 67/30 |
| 2021/0368015 A1* | 11/2021 | Wilson | H04L 67/535 |
| 2022/0109957 A1* | 4/2022 | Duan | H04W 4/029 |
| 2022/0217556 A1* | 7/2022 | Rydén | H04W 36/008375 |

OTHER PUBLICATIONS

Schmidt, "Anomaly Detection in Cloud Computing Environments", Jun. 18, 2020, (available at https://depositonce.tu-berlin.de/bitstream/11303/11511/4/schmidt_florian.pdf, visited Mar. 1, 2021).

* cited by examiner

SYSTEMS AND METHODS FOR OVER-THE-AIR UPDATE SCHEDULING OF SMART DEVICES BASED ON SIGNAL QUALITY AND DEVICE AVAILABILITY METRICS

CROSS-REFERENCE TO RELATED APPLICATION

This Application is a Continuation of U.S. patent application Ser. No. 17/188,792, filed on Mar. 1, 2021, titled "SYSTEMS AND METHODS FOR OVER-THE-AIR UPDATE SCHEDULING OF SMART DEVICES BASED ON SIGNAL QUALITY AND DEVICE AVAILABILITY METRICS," the contents of which are herein incorporated by reference in their entirety.

BACKGROUND

Internet of Things ("IoT") devices, smart devices, or other types of devices or systems may communicate via a network in order to perform functions such as reporting sensor information, outputting alerts, controlling connected devices such as lighting fixtures or video cameras, and/or other functions. IoT devices, smart devices, or the like may periodically or intermittently receive Over-the-Air ("OTA") updates, such as updates to baseband firmware, operating systems, applications, etc. that are executed by such devices. OTA updates may utilize various protocols, such as Lightweight Machine-to-Machine ("LwM2M"), Open Mobile Alliance ("OMA-DM"), Message Queueing Telemetry Transport ("MQTT"), Hypertext Transfer Protocol Secure ("HTTPS"), and/or other protocols. Success of OTA updates in a timely manner aids in proper functioning of IoT devices deployed in ever-increasing numbers, their protection from security vulnerabilities, and their proper control for reliable and efficient operation.

DETAILED DESCRIPTION OF EXAMPLE EMBODIMENTS

Figure 1:
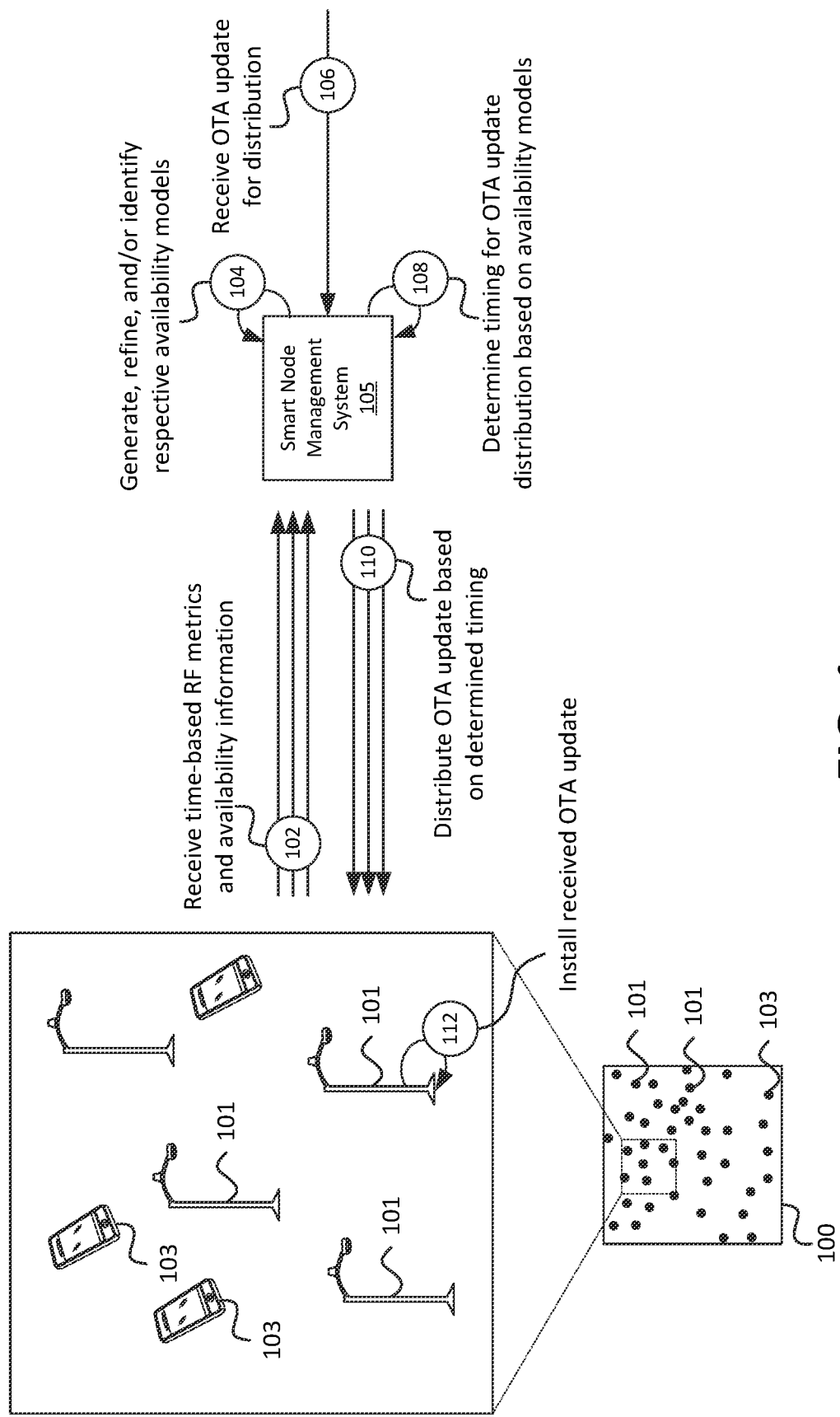
FIG. 1 illustrates an example overview of one or more embodiments described herein, in which availability models may be generated and used to determine whether to provide OTA updates to one or more smart devices, in accordance with some embodiments.

The following detailed description refers to the accompanying drawings. The same reference numbers in different drawings may identify the same or similar elements.

Embodiments described herein provide for the generation, refinement, turning, validating, etc. of models (e.g., using time-series analytical techniques such as machine learning ("ML") techniques or other suitable techniques) that may be used to predict whether a given network-accessible smart device or system (referred to herein as "smart devices") will be available at a given time. When a given smart device and its network connection are available, the smart device may be able to receive data via a network such as OTA updates, configuration instructions, and/or other types of data. Attempting to provide OTA updates or other suitable data when the smart device or its network connection is unavailable may result in the wasteful consumption of resources (e.g., network resources, processing resources, etc.). On the other hand, determining when the smart device and its network connection are likely to be available, in accordance with embodiments described herein, and providing OTA updates or other suitable data when the smart device is available may reduce the consumption of such resources and/or increase the overall efficiency of the network.

"Availability" of a given device or system (e.g., a "smart" device, an IoT device, a User Equipment ("UE"), or other type of device or system with network communication capability) may refer to whether such device or system is able to receive data via one or more networks. As discussed herein, a smart device may be considered as "available" when the smart device responds to a "ping," provides a "keep-alive" or "heartbeat" message at an expected time or interval, and/or is otherwise determined as being able to receive data. On the other hand, a smart device may be considered as "unavailable" or "not available" when the smart device does not respond to a "ping" within a threshold amount of time, does not provide one or more "keep-alive" or "heartbeat" messages at expected times or intervals, and/or is otherwise determined as not being able to receive data. In some embodiments, a smart device may be considered as "unavailable" or "not available" when performance metrics associated with the smart device (e.g., latency, throughput, jitter, packet error and/or loss rate, or the like) are below one or more thresholds, even in situations where such smart device responds to "pings," provides "keep-alive" or "heartbeat" messages, etc. A smart device may be unavailable due to a power outage, low wireless signal quality, high network load, outages associated with network infrastructure (e.g., wireless base stations, optical fibers, routers, switches, etc.) via which the smart device communicates, and/or other factors which may cause such smart device to be unable to receive data.

Embodiments described herein may reliably and determine or predict the availability of a given smart device, on a more granular basis than "pings," "keep-alive" messages, "heartbeat" messages, and/or other types of messages that may be used to determine availability the smart device. For example, the utilization of such messages may consume resources (e.g., network resources, processing resources, etc.). On the other hand, as described herein, availability may be determined or predicted based on metrics or information that may be generated or determined for other purposes, thereby resulting in minimal or zero additional consumption of network resources to determine or predict smart device availability. For example, smart devices may measure, determine, etc. radio frequency ("RF") metrics, such as signal to noise ratio ("SNR") metrics, Signal-to-Interference-and-Noise-Ratio ("SINR") metrics, Received Signal Strength Indicator ("RSSI") metrics, Reference Signal Receive Power ("RSRP") metrics, Reference Signal Received Quality ("RSRQ") metrics, Channel Quality Indicator ("CQI") metrics, and/or other measures of channel or signal quality during the course of operation, in order to facilitate communications with a radio access network ("RAN") of a wireless network. The use of such RF metrics, as described herein, may allow for the predictive determination of availability of such smart devices, on a more granular basis than (or without requiring) "pings," "keep-alive" messages, or the like.

As shown in FIG. 1, for example, a particular region 100 may include multiple smart devices, such as smart lighting fixtures 101 and UEs 103. Smart lighting fixtures 101 may be, for example, permanently affixed or mounted, semi-permanently affixed or mounted, and/or mobile devices located within region 100. Thus, while referred to herein as a "fixture," in some embodiments smart lighting fixture 101 may be, or may include, any suitable device that performs operations described herein. UE 103 may be, may include, and/or may be communicatively coupled to a mobile telephone, a tablet computing device, an IoT device, a Machine-to-Machine ("M2M") device, and/or some other type of device. In some embodiments, smart devices in region 100 may include one or more other types of devices in addition to, or in lieu of, smart lighting fixtures 101 and/or UE 103.

Smart devices in region 100 (e.g., smart lighting fixtures 101, UEs 103, and/or other devices with network communication capability) may communicate (e.g., via one or more wired and/or more wireless networks) with Smart Node Management System ("SNMS") 105, to send and/or receive information as described herein. For example, one or more smart lighting fixtures 101, UEs 103, and/or other smart devices may output (at 102) RF metrics to SLAMS 105. In some embodiments, network infrastructure elements, such as base stations (e.g., evolved Node Bs ("eNBs"), Next Generation Node Bs ("gNBs"), or other types of base stations), access points, data centers, or the like may output (at 102) the RF metrics to SLAMS 105.

The smart devices may, generate, measure, determine, etc. the RF metrics on a periodic basis, on an intermittent basis, on an event-based basis, and/or on some other basis. For example, smart lighting fixture 101, UE 103, etc. may determine the RF metrics every hour, every minute, upon connecting to a wireless network, upon detecting the presence of a base station (e.g., based on scanning for RF signals such as pilot signals, reference signals, Master Information Blocks ("MIBs"), etc.), or on some other basis. The smart devices may provide the measurements via a measurement report or in some other manner to one or more base stations, to SLAMS 105 (e.g., via an application programming interface ("API") or some other suitable communication pathway), and/or to one or more other network devices. SNMS 105 may store, maintain, etc. the RF metrics (and/or values derived therefrom) in a storage device, such as a local storage device, a cloud computing system, a data warehouse, a Hadoop Distributed File System ("HDFS"), etc. for processing and/or analytics in accordance with embodiments described herein.

In some embodiments, the smart devices (e.g., smart lighting fixture 101, UE 103, etc.) may provide (at 102) availability information to SNMS 105. For example, the smart devices may output (e.g., "push") traffic to SNMS 105 and/or to some other device or system indicating that the smart devices are able to send traffic via a network (e.g., a wireless network). Such traffic may be referred to as "keep-alive" messages, "heartbeat" messages, or the like. In some embodiments, the smart devices may respond to "pings" from SNMS 105 or some other device or system (e.g., SNMS 105 may "pull" traffic from the smart devices), thus indicating that the smart devices are capable of sending and receiving traffic. In some embodiments, SNMS 105 may receive one or more other types of metrics indicating performance or the ability of the smart devices to send and/or receive traffic, such as alerts, uplink and/or downlink throughput metrics, uplink and/or downlink latency metrics, uplink and/or downlink jitter metrics, and/or other suitable metrics.

In situations where expected availability information is not received from smart lighting fixture 101, UE 103, etc., SNMS 105 may determine that such devices are "unavailable" for a given time period (e.g., a time period represented by the expected message(s) from the smart devices). "Expected" availability information for a given smart device may refer to a schedule or other type of configuration whereby the smart device is configured to output (e.g., "push") availability information. For example, SNMS 105 may receive configuration information indicating that smart lighting fixture 101 is configured to output a "heartbeat" message every hour. If SNMS 105 determines that such a "heartbeat" message has not been received from smart lighting fixture 101 for a given hour, then SNMS 105 may determine that smart lighting fixture 101 is unavailable. If, on the other hand, SNMS 105 receives a "heartbeat" message from smart lighting fixture 101, then SNMS 105 may determine that smart lighting fixture 101 is available (e.g., is reachable via a network).

Additionally, or alternatively, "expected" availability information for a smart device may refer to a threshold amount of time, after attempting to "pull" availability information (e.g., outputting a "ping" to the smart device), that the availability information is received. If, for example, smart lighting fixture 101 does not respond to a "ping" within the threshold amount of time (e.g., ten seconds, one minute, or some other suitable threshold), then SNMS 105 may determine that smart lighting fixture 101 is unavailable. If, on the other hand, smart lighting fixture 101 responds within the threshold amount of time, then SNMS 105 may determine that smart lighting fixture 101 is available.

In some embodiments, availability information and RF metrics may be received at intervals that are independent of each other. For example, for a given smart device, SNMS 105 may receive RF metrics every hour, and may receive availability information every twelve hours. In some embodiments, different RF metrics for a given smart device may be received at varying intervals. For example, RSRP values for a given smart device may be determined at a first interval and/or a first arbitrary basis, while SINR values may be determined at a second interval and/or a second arbitrary basis. In this manner, differing types of RF metrics and/or availability information may be determined in a manner that is independent of each other, such that no particular pattern may exist or be identified with respect to intervals at which varying RF metrics and/or availability information are determined with respect to respective smart devices.

Based on the received information (e.g., the RF metrics and availability information), SNMS 105 may generate and/or refine (at 104), over time, one or more availability models. Examples of such availability models are described in more detail below with respect to FIG. 2. Briefly, availability models may correlate RF metrics, times at which RF metrics were determined or received, availability information, timing offsets indicating differences in times at which such RF metrics were determined or received, and times at which availability information was determined or received. Further, the availability models may include, and/or may be based on, timing offsets between when RF metrics were received and when availability information was determined. The timing offsets may be used to determine or indicate a feature importance and/or confidence level of particular RF metrics received at different times. For example, a first RF metric may be "less important" (e.g., less heavily weighted in the availability model) if determined a longer duration of time from a given availability indication than a second RF metric that is determined a lesser duration of time from the availability indication.

In some embodiments, the importance of a given RF metric may vary based on the amount of variance in RF metrics within a threshold duration of time. For example, if RSRP values fluctuate relatively greatly within a first time window, the RSRP values for that time window may be "less important" than RSRP values that fluctuate less and/or remain relatively steady within a second time window. As discussed below, the availability models may be used as predictive models in order to determine a likelihood of whether a given smart device will be available and reachable at a given time.

At some point, SLAMS 105 may receive (at 106) information, data, traffic, etc. to be distributed to smart devices within region 100. Additionally, or alternatively, SLAMS 105 may receive an indication that such information, data, traffic, etc. is to be distributed to smart devices within region 100. In some embodiments, such information, data, traffic, etc. may be, or may include, OTA updates (e.g., firmware updates, operating system updates, or the like) and/or other data. For the purposes of the examples provided herein, the information, data, traffic, etc. to be distributed includes an OTA update.

As the quantity of devices to receive the OTA update may be relatively large, the distribution of the OTA update to various devices may be a "campaign" in which distribution to different sets of devices is "staggered," such that all of the smart devices within region 100 (and/or all of the smart devices to which the OTA update applies, which may include smart lighting fixtures 101 and not UEs 103, or vice versa) receive the OTA update over time, but the OTA update is provided to different sets of the smart devices at different times. For example, the OTA update may be provided to one set of smart lighting fixtures 101 during a first time window (e.g., a first twelve-hour window), while the OTA update may be provided to a second set of smart lighting fixtures 101 during a second time window (e.g., a subsequent second twelve-hour window). Furthermore, device baseband firmware and application OTA updates may take place in different campaigns at different times, such as times that are based on the frequency or size of such updates.

In accordance with some embodiments, and as further described below, SNMS 105 may determine (at 108) timing for the distribution of the OTA update, in a manner that maximizes the likelihood that OTA updates are distributed to respective devices when such devices are available. Distributing OTA updates to devices when they are available may improve overall network efficiency, at least inasmuch as failed attempts to provide the OTA updates may result in the need to reattempt such delivery at a later time, thereby resulting in increased resource consumption. As explained in greater detail below, SNMS 105 may identify particular times at which particular smart devices or sets of smart devices are likely to be available based on continuing to monitor and/or receive RF metrics from smart devices, and utilizing the availability models and RF metrics to predict future availability of such smart devices.

For example, SNMS 105 may receive RF metrics over a given duration of time with respect to a given smart device, and may predict, based on the received RF metrics, that the smart device will be available at some point in the future (e.g., six hours after receiving the RF metrics, twelve hours after receiving the RF metrics, etc.). In some embodiments, SNMS 105 may detect and eliminate anomalies, outliers, etc., when generating one or more availability models. In some embodiments, SNMS 105 may generate one or more reports, alerts, etc., indicating such anomalies or outliers, which may be used to identify potential network issues for investigation or remediation. SNMS 105 may accordingly determine that the OTA update should be distributed to the smart device at the future time. SNMS 105 may further determine that the OTA update should be distributed to a different second smart device (or set of smart devices) in the interim (e.g., between a present time and the future time). For example, SNMS 105 may determine that the second smart device is less likely to be available at the future time than at the present time, and should therefore receive the OTA update at the present time.

In some embodiments, SNMS 105 may generate one or more availability scores for one or more smart devices, where a given availability score for a given smart device reflects the likelihood that the given smart device will be available at a given time (where "available" refers to the device being reachable via a network, as described above). In this manner, multiple availability scores (e.g., as determined based on time-series metrics, which may be determined or collected over differing periods of time and/or different cycles of time which may reflect time of day sensitivity and/or other cyclical trends) for the same smart device may indicate the respective likelihood that the smart device will be available at multiple times. SNMS 105 may accordingly schedule OTA updates for smart devices according to the availability score or scores for each such smart device, in order to maximize the cumulative likelihood of availability of numerous smart devices when providing the OTA updates to the smart devices.

SNMS 105 may further distribute (at 110) the OTA updates to respective smart devices based on the determined (at 108) timing for the OTA updates. For example, SNMS 105 may distribute the OTA updates to respective smart lighting fixtures 101, UEs 103, etc. in an order based on the determined availability scores. In some embodiments, SNMS 105 may provide the determined (at 108) timing or order to one or more other devices or systems, such as a Multi-Access/Mobile Edge Computing ("MEC") device, referred to sometimes herein simply as a "MEC," a Content Delivery Network ("CDN"), an application server, cloud platform, and/or some other device or system that distributes the OTA updates in a manner based on the determined timing or order. Once the OTA update is received by respective smart devices (e.g., a particular smart lighting fixture 101, as shown in FIG. 1), the respective smart devices may install (at 112) the received OTA updates.

Figure 2:
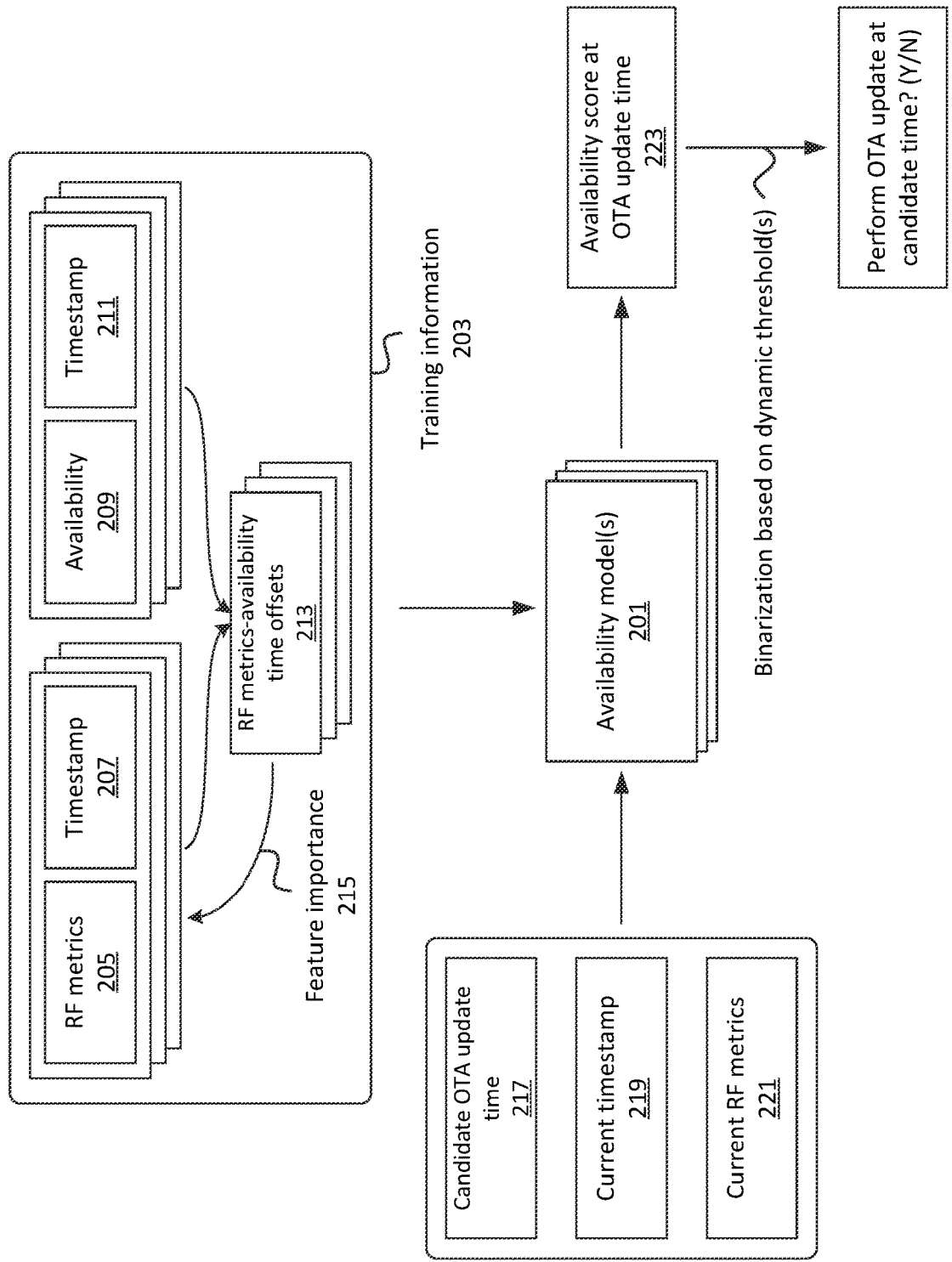
FIG. 2 illustrates an example of the generation and/or utilization of a given availability model to determine whether to provide an OTA update to a particular smart device, in accordance with some embodiments.

FIG. 2 illustrates the generation and/or utilization of a given availability model to determine whether to provide an OTA update to a particular smart device. For example, as noted above, SNMS 105 may generate, modify, and/or maintain one or more availability models 201. A particular availability model 201 may be associated with a particular region (e.g., a city, state, province, a coverage area associated with a particular base station of a RAN, or other type of region), a particular smart device, a particular group of smart devices (e.g., smart devices associated with a particular organization, a particular user, or the like), a particular type of smart device (e.g., a particular make and/or model, or other attributes of smart devices), or other category or grouping.

As shown, availability model 201 may be generated, modified, refined, trained, etc. based on training information 203. Training information 203 may be received from respective smart devices (e.g., one or more smart lighting fixtures 101, UEs 103, and/or other types of suitable devices with network connectivity) and/or from some other source, based on real-world measurements associated with such smart devices. Additionally, or alternatively, training information 203 may be generated by and/or received from a simulation system that simulates the operation of one or more smart devices and/or one or more networks to which such smart devices may communicate.

As shown, training information 203 may include RF metrics 205, which may include SINK values, RSRP values, RSRQ values, or the like, associated with one or more smart devices. RF metrics 205 may be associated with respective timestamps 207, which may indicate a time at which a given RF metric 205 was generated or received. For example, a first RSRP value associated with a particular smart lighting fixture 101, measured at a first time, may be associated with a first timestamp 207, while a second RSRP value (or other type of RF metric 205) associated with the same smart lighting fixture 101 or a different smart lighting fixture 101, measured at a second time, may be associated with a second timestamp 207. In this manner, availability model 201 may be based on multiple RF metrics 205, each associated with a respective timestamp 207.

Training information 203 may also include availability information 209, which may indicate the receipt of a response to a "ping," a "heartbeat" message, or the like from a given smart device. Additionally, or alternatively, availability information 209 may include and/or may be based on performance metrics, such as throughput, latency, jitter, or the like. Availability information 209 may also be associated with respective timestamps 211, which may indicate times at which availability information 209 was generated and/or received. As noted above, the times associated with RF metrics 205 may be independent of, and/or otherwise different or decoupled from, the times associated with availability information 209.

Figure 3:
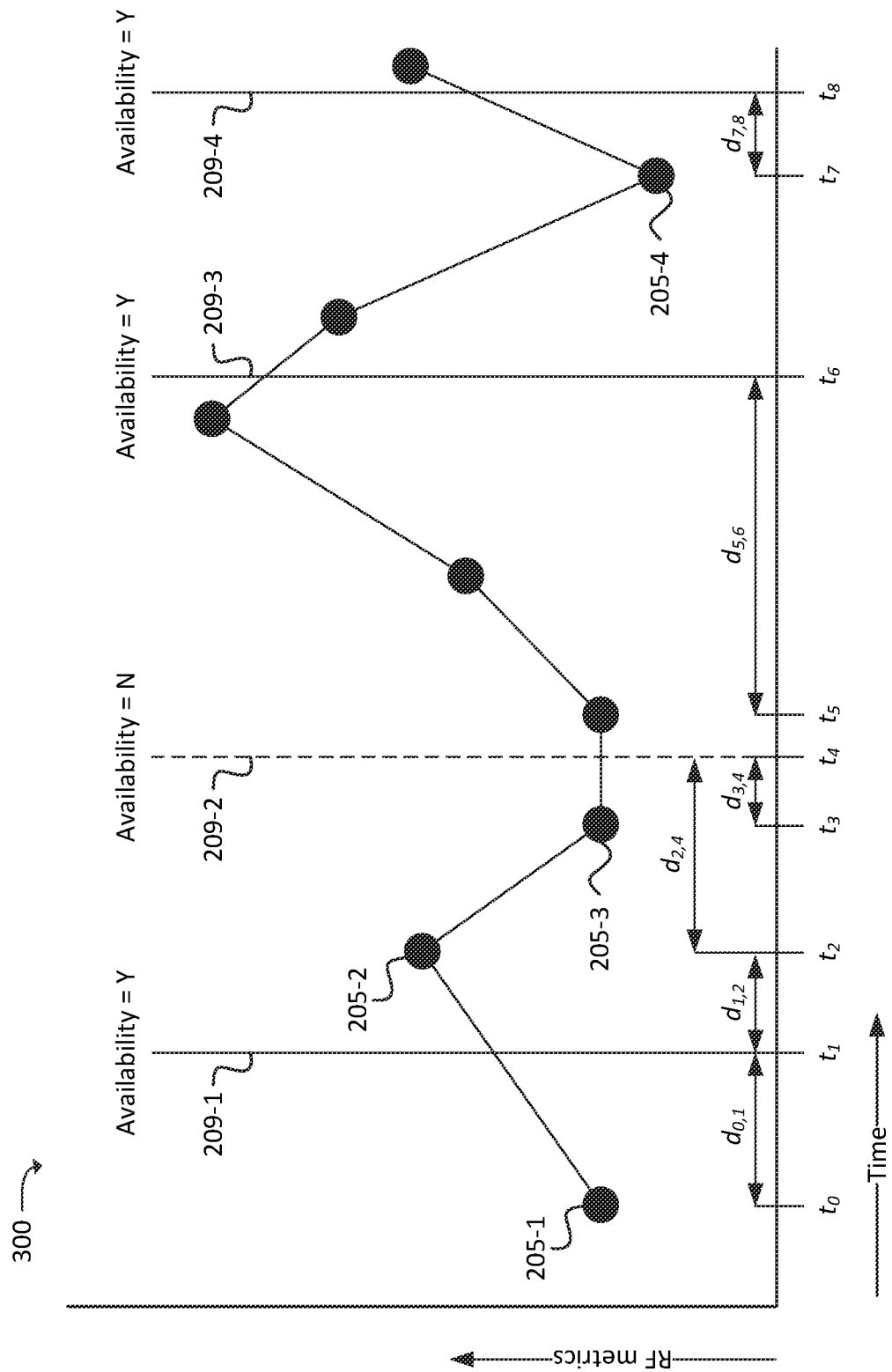
FIG. 3 illustrates an example of radio frequency ("RF") metrics and availability information that may be used to generate or refine a given availability model, in accordance with some embodiments.

Training information 203 may also include and/or be based on offset information 213, which may indicate timing offsets of RF metrics 205 and availability information 209. FIG. 3 depicts graph 300, which conceptually illustrates example offset information 213. As shown, graph 300 may represent particular values for RF metrics 205 as dots on the graph (e.g., including values 205-1 and 205-2), and may represent availability information 209 as vertical lines on the graph. For example, value 205-1 may be associated with a particular timestamp 207, indicating that value 205-1 was received, generated, and/or otherwise associated with a particular time to. In some embodiments, higher values in graph 300 may represent higher values for respective RF metrics 205. For example, value 205-1 may indicate a first RSRP value, while value 205-2 may represent a second, higher RSRP value. In some embodiments, values 205-1, 205-3, etc. in graph 300 may be "normalized" values and/or scores derived from multiple different types of RF metrics 205. For example, value 205-1 may be a score or other derivation of one or more RSRP values, and value 205-2 may be a score or other derivation of one or more RSRQ values, one or more SINK values, and/or one or more other types of RF metrics 205.

Further, availability information 209-1 may be associated with a particular timestamp 211, indicating that availability information 209-1 was received, generated, and/or otherwise associated with a subsequent time $t_1$. Availability information 209-1, 209-3, and 209-4 may indicate that a given smart device was available at respective times $t_1$, $t_6$, and $t_8$, while availability information 209-2 may indicate that a given smart device was not available at time $t_4$.

As noted above, SNMS 105 may determine timing offsets, differences, deltas, or the like between respective values for RF metrics 205 and respective availability information 209. For example, value 205-1 and availability information 209-1 may be associated with timing offset $d_{0,1}$, value 205-2 and availability information 209-1 may be associated with timing offset $d_{4,2}$, value 205-2 and availability information 209-2 may be associated with timing offset $d_{2,4}$, and so on. As shown, for example, timing offset $d_{2,4}$, associated with value 205-2 and availability information 209-2, may be greater than timing offset $d_{3,4}$, associated with value 205-3 and availability information 209-2. That is, value 205-3 may be closer in time to availability information 209-2 than value 205-2 is to availability information 209-2.

Based on the lower timing offset $d_{3,4}$ between value 205-3 and availability information 209-2 than the timing offset $d_{2,4}$ between value 205-2 and availability information 209-2, SNMS 105 may determine a greater feature importance 215 for value 205-3 than value 205-2. As noted above, availability score 223 for a respective RF metric value 205 may indicate a weight, importance, or other parameter based on which RF metric value 205 is reflected in availability model 201. For example, a value with higher feature importance 215 may be weighted more heavily in availability model 201 than a value with a lower feature importance 215.

In some embodiments, a particular RF metric value 205 may have varying levels of feature importance for different times. For example, value 205-2 may be more important with respect to time $t_1$ than to time $t_4$. That is, as shown, timing offset $d_{1,2}$, between value 205-2 and availability information 209-1, may be smaller than timing offset $d_{2,4}$, between value 205-2 and availability information 209-2.

In some embodiments, availability score 223 for a given RF metric value 205 may be based on one or more other factors, in addition to timing offset information 213. For example, as noted above, values that exhibit relatively large fluctuations within a relatively brief period of time may have reduced availability score 223 based on the amount of fluctuation. For example, value 205-4 may have reduced availability score 223 based on "spiking down" compared to values received prior and subsequent to value 205-4.

In some embodiments, availability score 223 for a given RF metric value 205 may be based on a correlation between the given RF metric value 205, a threshold value, a range of values, and availability information 209. For example, value 205-3 may be relatively low (e.g., below a threshold value), outside a range (e.g., specified by the device manufacturer and/or vendor), and availability information 209-2 may indicate that a given smart device was not available (e.g., was not reachable via a network). Since value 205-3 is below the threshold value, and further since availability information 209-2 indicates that the smart device was not available, availability score 223 for value 205-3 may be increased.

For example, the relatively low value 205-3 (e.g., below the threshold) may confirm that this value is "correct" or "predictive," inasmuch as the threshold may be indicative of whether the smart device was available or not. Similarly, availability score 223 for value 205-4 may be reduced, as value 205-4 may be below the threshold value, but temporally proximate availability information 209-4 may indicate that a given smart device was available. For example, the relatively low value 205-4 may indicate that this value is "incorrect" or "not predictive."

In some embodiments, graph 300 may correspond to a repeating or cyclic time window. For example, graph 300 may reflect one day, one week, one month, or some other suitable time window. Such cyclic time window may be determined using analytical techniques such as machine learning ("ML") or other suitable techniques. For example, SLAMS 105 may identify time windows at which the same or similar (e.g., within a threshold measure of similarity) RF metric values 205 and/or availability information 209 are determined. Such similar metrics may occur cyclically based on, for example, times corresponding to morning or evening commutes, times corresponding to repeating events, and/or other phenomena.

Returning to FIG. 2, availability model 201 may reflect, for one or more RF metrics 205, the availability score 223 of respective RF metrics 205 for given timestamps 207. Further, as noted above, a particular set of RF metrics 205, availability information 209, offset information 213, and availability score 223 may be associated with a given cyclical time window (e.g., day, week, etc.). In this manner, availability model 201 may be used to predict availability of a given smart device based on a current time and based on RF metrics associated with the smart device at the current time.

For example, as shown, SLAMS 105 may determine, for a particular candidate OTA update time 217, whether a given smart device will be available. SLAMS 105 may determine, for example, a current timestamp 219 associated with a set of RF metrics 221. RF metrics 221 may be associated with, for example, a particular network device for which an OTA update is to be performed. Candidate OTA update time 217 may be time at which SLAMS 105 is attempting to determine whether the smart device will be available. In this manner, SLAMS 105 may perform a similar analysis multiple times for the same smart device (e.g., for multiple different candidate OTA update times 217), in order to determine an optimal time to schedule the OTA update (e.g., a time at which the smart device is likely to be available to receive the OTA update).

SNMS 105 may evaluate, for example, candidate OTA update time 217, timestamp 219, and RF metrics 221 against one or more availability models 201, in order to determine availability score 223 associated with candidate OTA update time 217 for the network device. In some embodiments, SNMS 105 may select a particular availability model 201 based on a comparison of RF metrics 205, included in one or more availability models 201, to RF metrics 221 associated with a given smart device. For example, as shown in FIG. 4, RF metrics 221 associated with a particular smart lighting fixture 101 may more closely match RF metrics 205 associated with availability model 201-1 than RF metrics associated with availability model 201-2.

Specifically, for example, RF metrics 221 may correspond to a portion of a time window associated with candidate availability models 201-1 and 201-2. For example, assuming that availability models 201-1 and 201-2 are associated with an example time window of 24 hours, RF metrics 221 associated with smart lighting fixture 101 may correspond to a 10-hour portion of the 24-hour time window (e.g., the first 10 hours, the last 10 hours, or some other 10-hour window within the 24-hour time window). SNMS 105 may select availability model 201-1 based on RF metrics 401 associated with availability model 201-1, corresponding to the same 10-hour time window, matching RF metrics 221 more closely than RF metrics associated with other candidate availability models 201 (e.g., RF metrics 403 associated with availability model 201-2). Accordingly, SNMS 105 may select availability model 201-1 to predict the availability of smart lighting fixture 101 (e.g., in lieu of selecting availability model 201-2).

As further shown, SNMS 105 may identify a feature importance of particular values of RF metrics 221 associated with smart lighting fixture 101. For example, SNMS 105 may compare RF metrics 221 to RF metrics 401, associated with availability model 201-1, and may identify availability score 223 associated with particular values of RF metrics 401 associated with availability model 201-1. As noted above, the feature importance of particular values of RF metrics 401 and/or 221 may be based on a time offset between the particular values and some other time (e.g., a candidate OTA update time 217), and/or one or more other factors, as discussed above.

Figure 4:
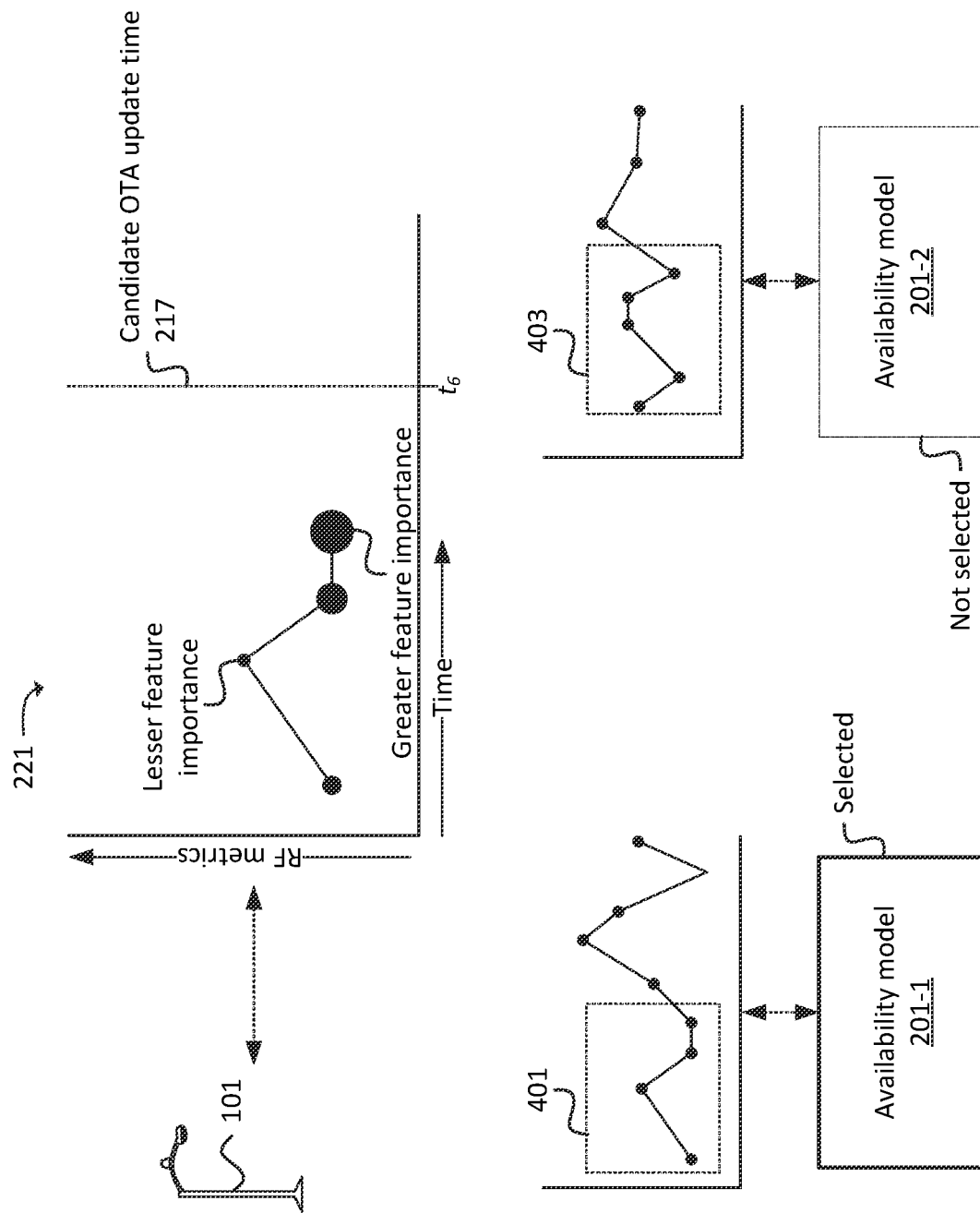
FIG. 4 illustrates an example of selecting a particular availability model and determining feature importance of RF metrics associated with a smart device to be updated at a particular time, in accordance with some embodiments.

The feature importance of particular values of RF metrics 221 is reflected in FIG. 4 by larger or smaller circles representing particular values. For example, larger circles indicate greater measures of feature importance, while smaller circles indicate lesser measures of feature importance. The measures of importance of particular values of RF metrics 221 may be based on, for example, corresponding values of RF metrics 401 (e.g., where "corresponding" values are values at the same time position within the time window and/or are within a threshold time offset of the time position within the time window). The measures of importance of particular values of RF metrics 221 may further be based on a time offset between the particular values and candidate OTA update time 217. As noted above, SLAMS 105 may perform similar analyses based on multiple different candidate OTA update times 217, in order to determine a suitable time (or time window) at which an OTA update (or other traffic) should be provided to smart lighting fixture 101.

In this example, assume that candidate OTA update time 217 corresponds to time $t_6$ (e.g., is the same as time $t_6$ within a given time window, and/or is within a threshold time offset of time $t_6$). Referring back to the example of FIG. 3, time $t_6$ may be a time within the particular time window (e.g., the example 24-hour time window) at which availability information 209 indicates a positive indication of device availability.

Figure 5:
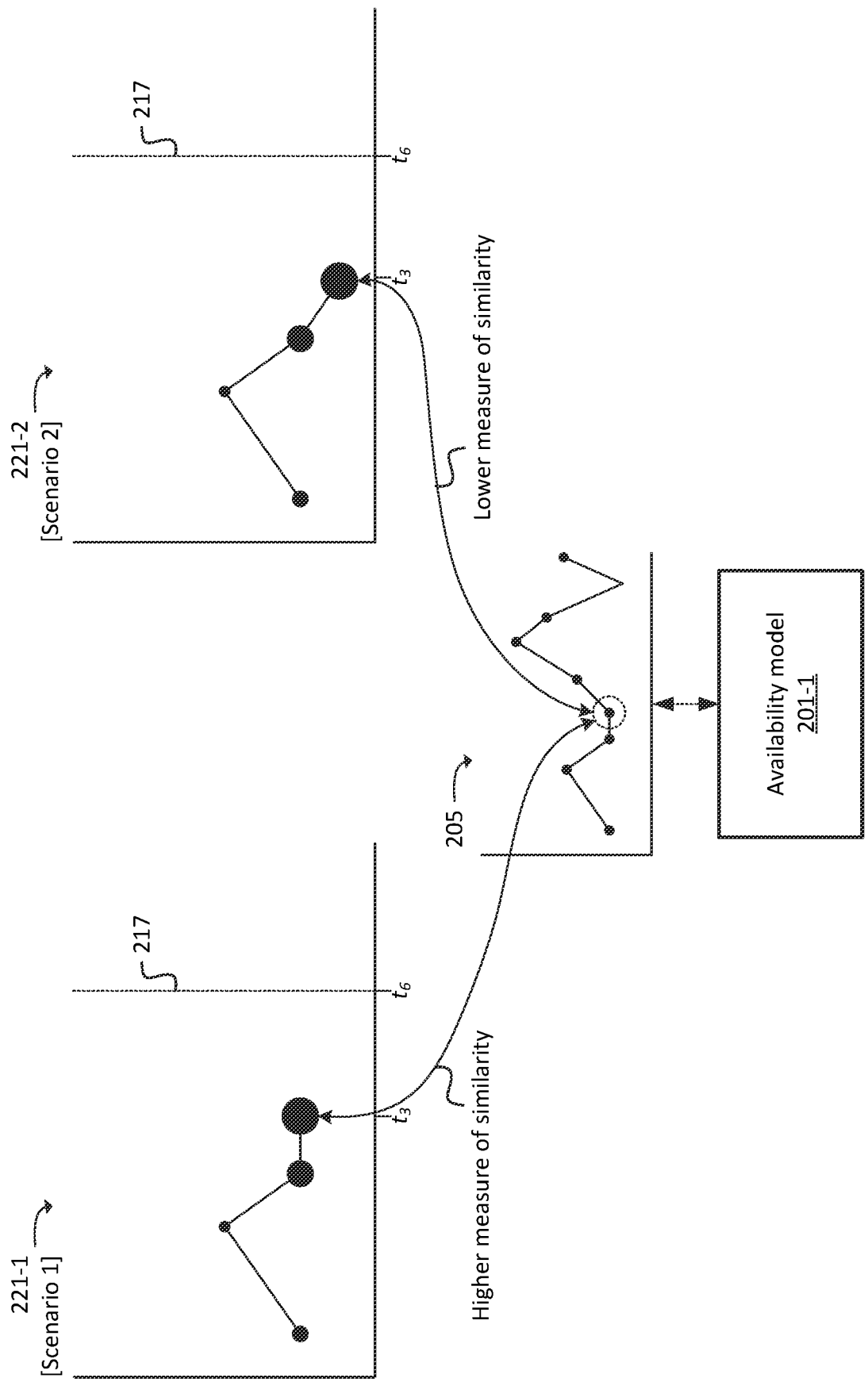
FIG. 5 illustrates example scenarios in which availability scores for a particular smart device may be different, based on similarity or dissimilarity to RF metrics associated with an availability model, in accordance with some embodiments.

SLAMS 105 may compare the similarity of the values of RF metrics 221 to corresponding values (e.g., at corresponding times) of RF metrics 205 associated with availability model 201-1. For example, as shown in FIG. 5, SLAMS 105 may identify that, under a first scenario, RF metrics 221-1 associated with smart lighting fixture 101 includes a value, at time $t_3$, that has a relatively high measure of similarity to a corresponding value of RF metrics 205 associated with availability model 201-1 (e.g., at time $t_3$ or at about time $t_3$). For example, these values may be the same, and/or within a threshold range of each other. Under an alternate scenario, SNMS 105 may identify that RF metrics 221-2 associated with smart lighting fixture 101 includes a value, at time $t_3$, that has a relatively low (or lower) measure of similarity to a corresponding value of RF metrics 205 associated with availability model 201-1.

Under the first scenario, SNMS 105 may determine, with a relatively higher degree of confidence (which may be reflected by a relatively high availability score 223 for this scenario) that smart lighting fixture 101 is likely to be available at candidate OTA update time 217. For example, as shown in the example of FIG. 3, availability model 201-1 may indicate that a given smart device is likely to be available at time $t_6$ based on the example values of RF metrics 205 at time $t_3$ (e.g., a value matching the corresponding value for RF metrics 221-1 in the first scenario). Further, as the value at time $t_3$ is relatively important, the matching of the values at $t_3$ between RF metrics 221-1 and RF metrics 205 of availability model 201-1 may be a relatively strong (e.g., with high degree of confidence) indicator that smart lighting fixture 101 will be available at time $t_6$.

On the other hand, under the second scenario, the determination of whether smart lighting fixture 101 will be available at time $t_6$ may be made with a lower degree of confidence than under the first scenario, which may be reflected in a relatively lower availability score 223 than an example availability score 223 associated with the first scenario. For example, the value at time $t_3$, associated with RF metrics 221-2, may be less similar or may be dissimilar to the corresponding value of RF metrics 205 associated with availability model 201-1. Based on the relatively lower similarity of these values at time $t_3$, under this second scenario, SNMS 105 may determine with a relatively lower (e.g., compared to the first scenario) degree of confidence that smart lighting fixture 101 will be available at time $t_3$, and/or may determine that smart lighting fixture 101 will not be available at time $t_3$.

Returning to FIG. 2, SNMS 105 may determine whether to perform an OTA update at candidate OTA update time 217, based on availability score 223 that was determined based on RF metrics 221 associated with a given smart device, as well as one or more availability models 201 as described above. For example, SNMS 105 may perform a binarization operation whereby availability score 223 is converted to a binary value (e.g., "0" or "1," "yes" or "no," "push update" or "do not push update," etc.). For example, SNMS 105 may compare availability score 223 to a threshold score, where exceeding the threshold score may indicate that the smart device is likely to be available at candidate OTA update time 217, while not exceeding the threshold score may indicate that the smart device is not likely to be available at candidate OTA update time 217, and/or that the likelihood that the smart device will be available at candidate OTA update time 217 does not satisfy a threshold likelihood. In some embodiments, the threshold score may be dynamically adjusted (e.g., using ML techniques or other suitable techniques), based on feedback indicating whether OTA updates were successful when SNMS 105 determined (e.g., based on the binarization) that given smart devices were available.

As noted above, SNMS 105 may perform similar operations iteratively (e.g., based on the same set of RF metrics 221 and varying candidate OTA update times 217) for one or more smart devices, in order to holistically determine a schedule for providing the OTA updates that maximizes an overall likelihood of successfully providing the OTA updates to a relatively large quantity of smart devices. For example, such schedule may be based on a determination, with relatively high degrees of confidence, of when smart devices are available to receive such OTA updates. In some embodiments, SNMS 105 may determine such schedule based on the determined availability scores 223 (e.g., without performing a binarization procedure). For example, SNMS 105 may schedule OTA updates for a set of smart devices in a manner that maximizes or otherwise optimizes a cumulative or aggregate of respective availability scores 223 (e.g., at particular times 217) for the set of smart devices.

Figure 6:
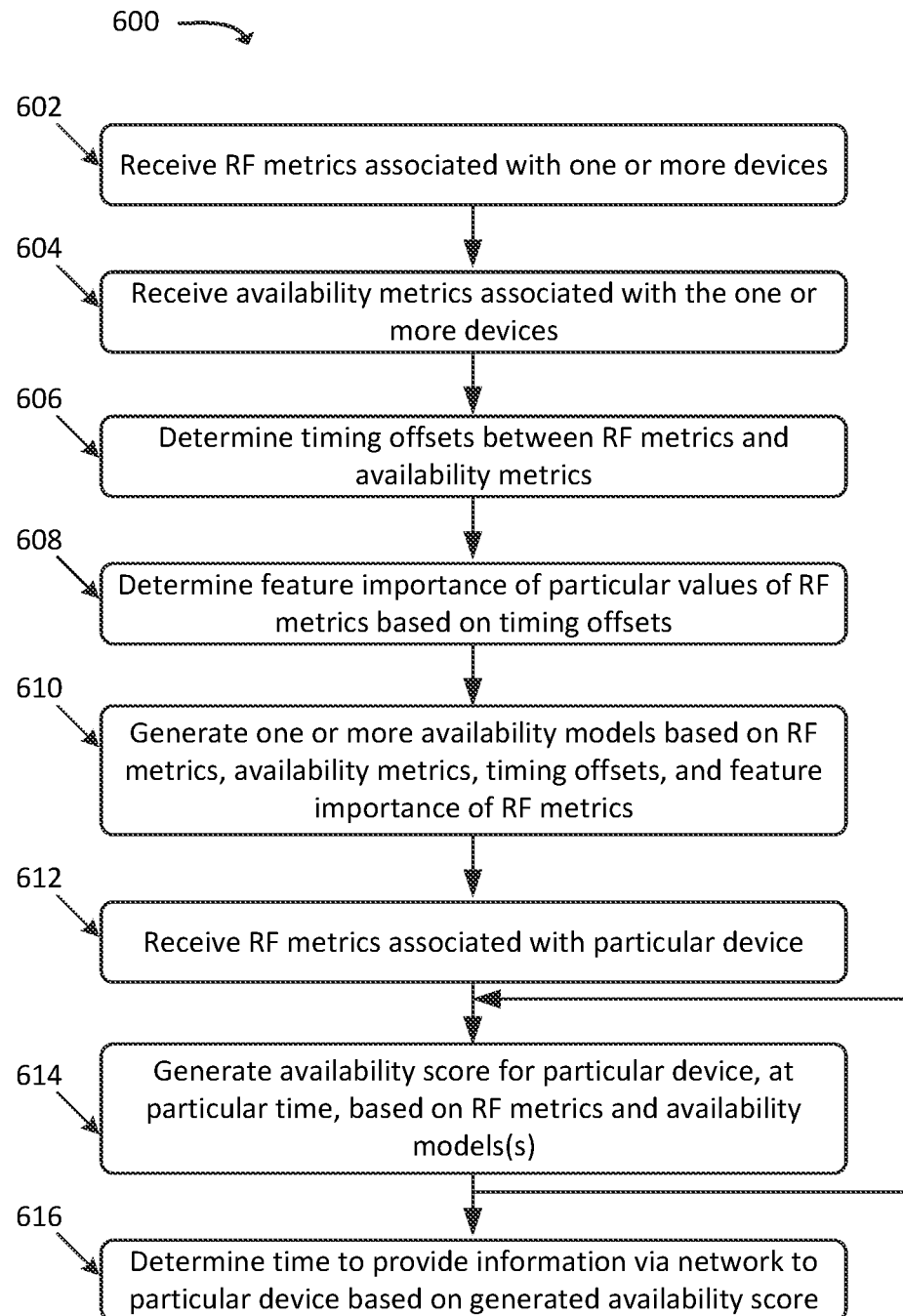
FIG. 6 illustrates an example process for generating and using an availability model to predict whether a given smart device will be available at a given time, in accordance with some embodiments.

FIG. 6 illustrates an example process 600 for generating and using one or more availability models to predict whether a given smart device will be available at a given time (e.g., at a particular candidate OTA update time 217). In some embodiments, some or all of process 600 may be performed by SLAMS 105. In some embodiments, one or more other devices may perform some or all of process 600 (e.g., in concert with, and/or in lieu of, SLAMS 105).

As shown, process 600 may include receiving (at 602) RF metrics associated with one or more devices. For example, as discussed above, SLAMS 105 may receive RF metrics from one or more devices (e.g., smart devices such as smart lighting fixtures 101, UEs 103, and/or other devices), and/or from one or more devices or systems that collect and provide such metrics (e.g., a base station of a wireless network). Additionally, or alternatively, SLAMS 105 may generate or receive such metrics via a simulation of operation of such devices.

Process 600 may further include receiving (at 604) availability metrics associated with the one or more devices. For example, as discussed above, SLAMS 105 may determine whether the one or more devices (e.g., the devices associated with the RF metrics) are available at particular times. As noted above, "availability" may include whether such devices responded to "pings," output "heartbeat" or "keep-alive" messages, exhibited performance metrics above a threshold, within a range, or other indications of the ability of such devices to receive data via a network.

Process 600 may additionally include determining (at 606) timing offsets between the RF metrics and the availability metrics. For example, as discussed above, SLAMS 105 may determine differences, offsets, deltas, or the like between particular values of the received (at 602) RF metrics and the determined (at 604) availability metrics.

Process 600 may also include determining (at 608) a feature importance of particular values of the RF metrics based on the timing offsets. For example, as discussed above, SLAMS 105 may determine a measure of importance, a weight, etc. for one or more of the values of the RF metrics with respect to particular times at which availability metrics were determined. In some embodiments, a particular value of the RF metrics may have multiple measures of importance, where each measure of importance is associated with a timing offset between a time associated with the value (e.g., a time at which the value was measured, a time at which the value was received by SLAMS 105, etc.) and a time associated with a particular availability metric.

Process 600 may further include generating (at 610) one or more availability models based on the RF metrics, availability metrics, timing offsets, and feature importance of the RF metrics. For example, as discussed above, SLAMS 105 may determine one or more availability models 201 based on the received and/or determined (at 602-608) information. In some embodiments, availability models 201 may be classified, clustered, grouped, etc. according to any suitable category, attribute, etc. For example, a first availability model 201 may be associated with a first region 100, while a second availability model 201 may be associated with a second region. As another example, a first availability model 201 may be associated with a first device type, while a second availability model 201 may be associated with a second device type. In some embodiments, availability models 201 may be multi-dimensional models. For example, a first availability model 201 may be associated with a first region 100 and a first device type, a second availability model 201 may be associated with the first region 100 and a second device type, a third availability model 201 may be associated with a second region 100 and the first device type, a fourth availability model 201 may be associated with the second region 100 and the second device type, and so on. As another example, a first availability model 201 may be associated with a particular device type, and a first usage pattern (e.g., an amount of usage over a given time window, types of traffic sent and/or received by the device, etc.), and a second availability model 201 may be associated with the same particular device type and a second usage pattern or other device attributes or parameters.

Process 600 may additionally include receiving (at 612) RF metrics associated with a particular device. For example, SLAMS 105 may receive RF metrics associated with one or more devices for which information (e.g., an OTA update or other suitable information) is to be provided via a network.

Process 600 may also include generating (at 614) one or more availability scores for the particular device, at a particular time, based on the RF metrics associated with the particular device and further based on the one or more generated availability models. For example, as discussed above, SLAMS 105 may determine a feature importance of particular values of the RF metrics based on corresponding values and measures of feature importance for RF metrics included in one or more availability models 201 (e.g., a particular availability model 201 that matches attributes of the particular device, a particular availability model 201 for which RF metrics match or partially match the received (at 612) RF metrics of the device, etc.). The higher the feature importance is for a given RF metric, the greater impact that specific RF metric may have on an availability score derived from such RF metric. As noted above, in some embodiments, SLAMS 105 may generate (at 614) multiple availability scores for the particular device, where each availability score is associated with a different candidate time.

Process 600 may further include determining (at 616) a time to provide information via a network to the particular device based on the one or more generated availability scores. For example, SLAMS 105 may identify a time for which the particular device is associated with a highest availability score (as generated at one or more iterations of operation 614), and/or may identify one or more times for which such availability scores exceed a threshold score. In some embodiments, SLAMS 105 may compare the availability scores for multiple devices and/or at multiple times, in order to determine respective times (or ranges of times) at which to provide the information (e.g., OTA updates or other suitable information) to multiple devices via one or more networks, in order to maximize the likelihood that all of the devices will be available to receive the information.

Figure 7:
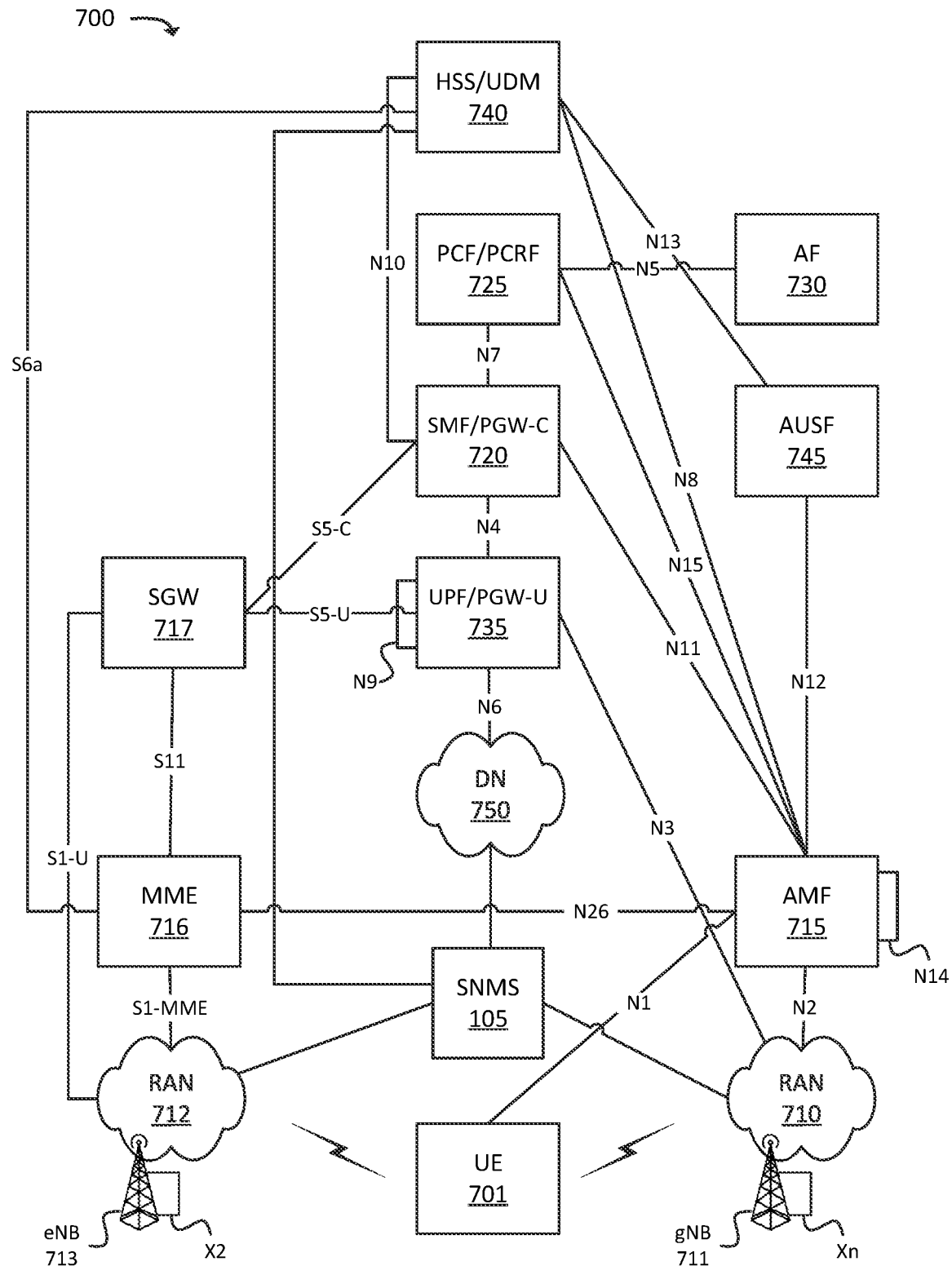
FIG. 7 illustrates an example environment in which one or more embodiments, described herein, may be implemented.

FIG. 7 illustrates an example environment 700, in which one or more embodiments may be implemented. In some embodiments, environment 700 may correspond to a Long-Term Evolution ("LTE") Cat-M1 network, Fifth Generation ("5G") network, and/or may include elements of an LTE network, a 5G network, and/or some other type of network. In some embodiments, environment 700 may correspond to a 5G Non-Standalone ("NSA") architecture, in which a 5G radio access technology ("RAT") may be used in conjunction with one or more other RATs (e.g., a Long-Term Evolution LTE RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as SLAMS 105.

The example shown in FIG. 7 illustrates one instance of each network component or function (e.g., one instance of SMF/PGW-C 720, PCF/PCRF 725, UPF/PGW-U 735, HSS/UDM 740, and/or 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 701 may send traffic to and/or receive traffic (e.g., user plane traffic) from DN 750 via RAN 710, RAN 712, and/or UPF/PGW-U 735. In some embodiments, UE 103, smart lighting fixture 101, and/or one or more components thereof, may be, may include, and/or may be implemented by one or more UEs 701.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

SLAMS 105 may include one or more devices, systems, VNFs, etc., that perform one or more operations described herein. For example, SLAMS 105 may generate one or more predictive models of device availability, which may be used to predict whether a given device will be able to be reached via one or more networks to receive information, such as OTA updates. The predictive models may be based on, for example, radio frequency RF metrics, availability metrics, and timing offsets between times associated with such RF metrics and availability metrics. For a given device, based on RF metrics associated with the device and further based on a candidate time, SLAMS 105 may use the predictive model to determine whether the device will be available at the candidate time.

Figure 8:
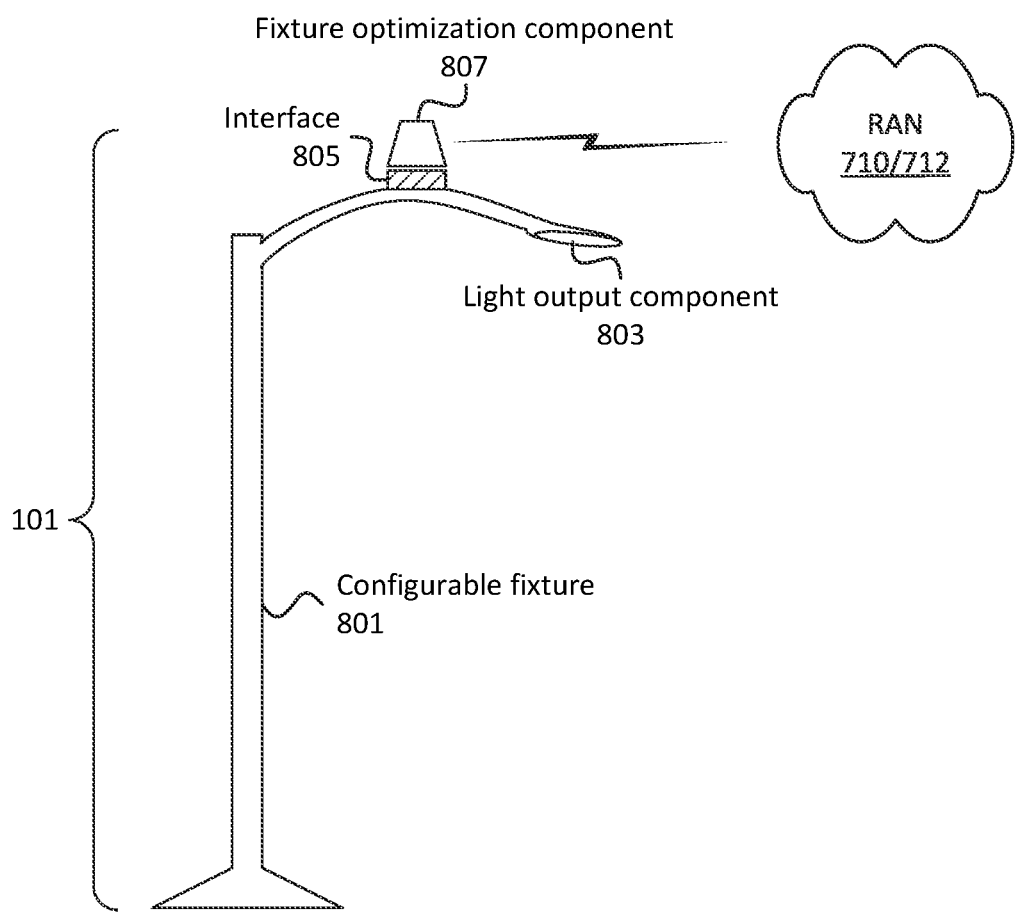
FIG. 8 illustrates an example of a smart lighting fixture, in accordance with some embodiments.

FIG. 8 illustrates example components of smart lighting fixture 101. As shown, smart lighting fixture 101 may include configurable fixture 801, light output component 803, interface 805, and Fixture Optimization Component ("FOC") 807. Configurable fixture 801 may include and/or may receive power (e.g., electrical power) from an external source, such as a transformer, a solar panel, or the like. Configurable fixture 801 may provide power to light output component 803 and to FOC 807 (e.g., via interface 805). Light output component 803 may include one or more bulbs or light modules (e.g., Light-Emitting Diode ("LED") modules, incandescent bulbs, fluorescent bulbs, etc.) or other light output components. In some embodiments, interface 805 and/or FOC 807 may include a controller, a relay, a dimmer, a switch, or some other suitable component to control (e.g., power on, power off, set brightness level, etc.) light output component 803. For example, FOC 807 may (e.g., via interface 805) provide an instruction or indication of a given brightness level, and light output component 803 may increase or decrease an amount of voltage provided to a bulb, LED module, etc. of light output component 803 based on the indicated brightness level.

Interface 805 may include an interface that may receive control signals (e.g., to control the brightness level of light output component 803, to perform dimmer operations with respect to light output component 803, etc.) or other suitable types of information from FOC 807. Further, in some embodiments, interface 805 may be or may include a physical interface, such as an American National Standards Institute ("ANSI") C136.41 dimming receptacle and/or some other suitable type of physical interface via which FOC 807 can be communicatively coupled to light output component 803.

FOC 807 may include wireless communication circuitry, such that FOC 807 may communicate wirelessly, via one or more networks (e.g., RAN 710 and/or RAN 712), with SLAMS 105 and/or one or more other devices or systems. Smart lighting fixture 101 and/or FOC 807 may operate according to firmware, an operating system, etc. that may be updated according to an OTA update process, as discussed herein. For example, smart lighting fixture 101 (e.g., FOC 807 and/or some other component of smart lighting fixture 101) may receive such OTA updates via one or more networks, such as via RAN 710 and/or RAN 712.

Figure 9:
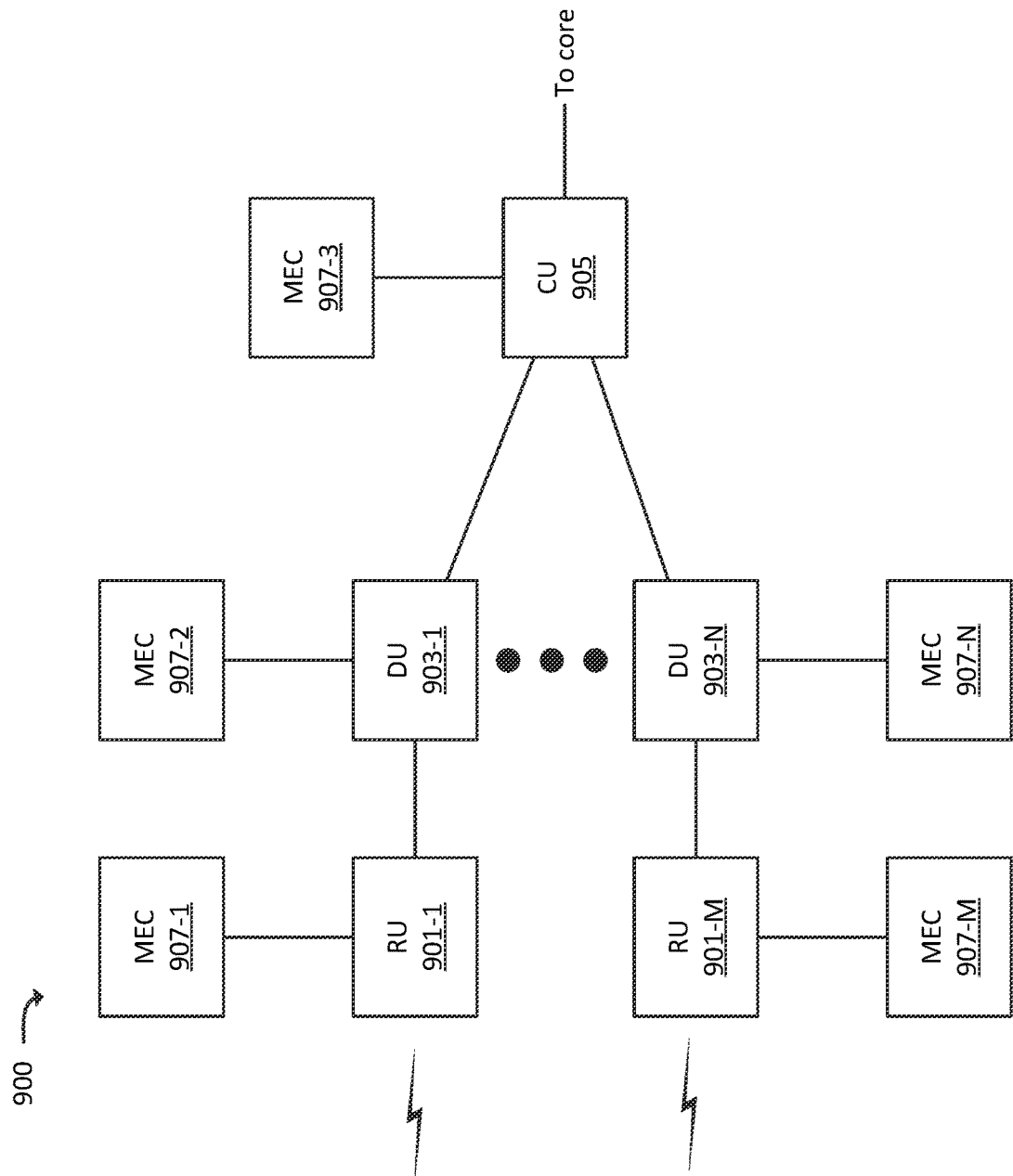
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 710, RAN 712, or some other RAN). In some embodiments, a particular RAN may include one DU network 900. In some embodiments, a particular RAN may include multiple DU networks 900. In some embodiments, DU network 900 may correspond to a particular gNB 711 of a 5G RAN (e.g., RAN 710). In some embodiments, DU network 900 may correspond to multiple gNBs 711. In some embodiments, DU network 900 may correspond to one or more other types of base stations of one or more other types of RANs. As shown, DU network 900 may include Central Unit ("CU") 905, one or more Distributed Units ("DUs") 903-1 through 903-N(referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 701, and may determine which DU(s) 903 should receive the downlink traffic. DU 903 may include one or more devices that transmit traffic between a core network (e.g., via CU 905) and UE 701 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 701.

RU 901 may include hardware circuitry (e.g., one or more RF transceivers, antennas, radios, and/or other suitable hardware) to communicate wirelessly (e.g., via an RF interface) with one or more UEs 701, one or more other DUs 903 (e.g., via RUs 901 associated with DUs 903), and/or any other suitable type of device. In the uplink direction, RU 901 may receive traffic from UE 701 and/or another DU 903 via the RF interface and may provide the traffic to DU 903. In the downlink direction, RU 901 may receive traffic from DU 903, and may provide the traffic to UE 701 and/or another DU 903.

RUs 901 may, in some embodiments, be communicatively coupled to one or more MECs 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 701, via a respective RU 901.

For example, RU 901-1 may route some traffic, from UE 701, to MEC 907-1 instead of to a core network (e.g., via DU 903 and CU 905). MEC 907-1 may process the traffic, perform one or more computations based on the received traffic, and may provide traffic to UE 701 via RU 901-1. In this manner, ultra-low latency services may be provided to UE 701, as traffic does not need to traverse DU 903, CU 905, and an intervening backhaul network between DU network 900 and the core network. In some embodiments, MEC 907 may include, and/or may implement, some or all of the functionality described above with respect to SLAMS 105.

Figure 10:
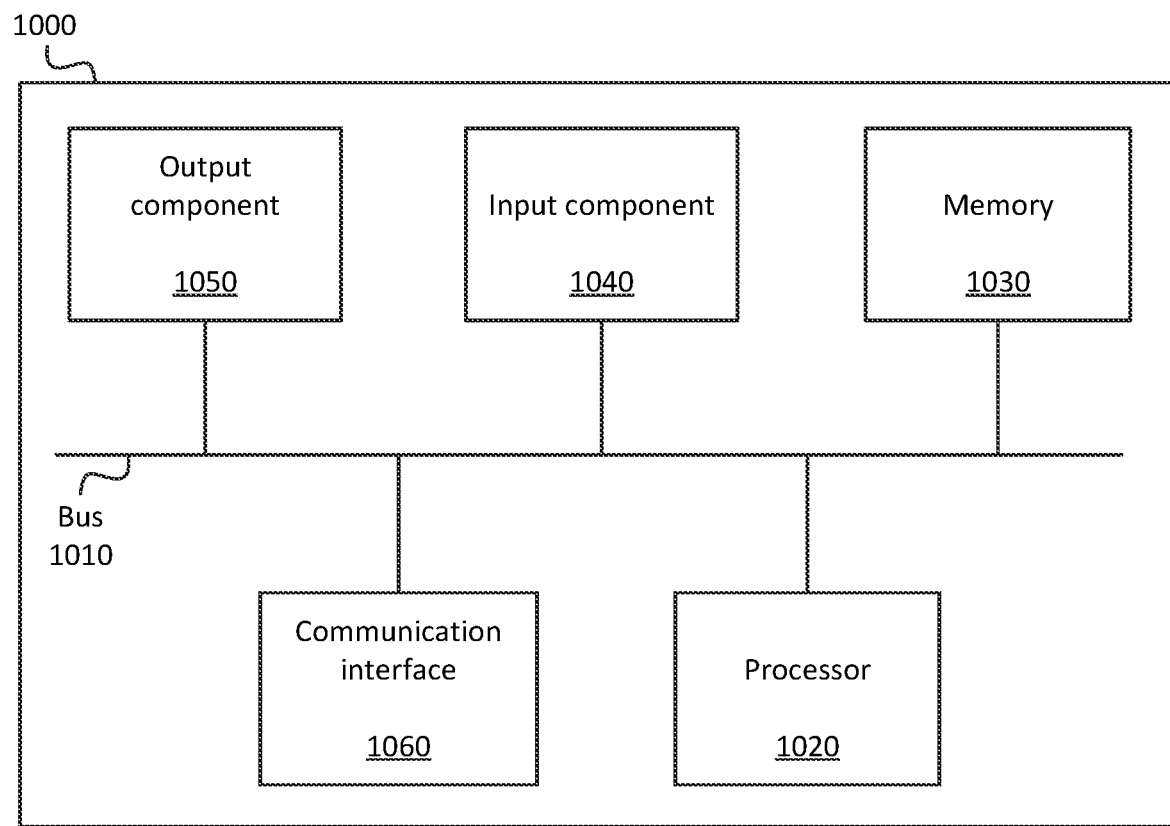
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6) the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      determine a first set of differences between a plurality of radio frequency ("RF") metrics associated with one or more devices and availability metrics associated with the one or more devices;
      determine a second set of differences between a set of RF metrics associated with a particular device and a first time;
      generate one or more scores based on the first and second sets of differences;
      determine, based on the generated one or more scores, a second time at which to output information to the particular device; and
      output, at the determined second time, the information to the particular device.

2. The device of claim 1, wherein the first set of differences include differences between times with which the plurality of RF metrics are associated and times with which the availability metrics are associated.

3. The device of claim 1, wherein the second set of differences include a difference between a time with which the set of RF metrics are associated and the first time.

4. The device of claim 3, wherein the set of RF metrics associated with the particular device include RF metrics measured by the particular device, wherein the time with which the set of RF metrics are associated includes a time at which the RF metrics were measured by the particular device.

5. The device of claim 1, wherein the availability metrics include indications of whether the one or more devices were able to send or receive traffic via one or more networks.

6. The device of claim 1, wherein the one or more processors are further configured to:
   determine a feature importance of respective values associated with the plurality of RF metrics based on differences between the values associated with the plurality of RF metrics and the availability metrics,
   wherein the one or more scores are generated based on the feature importance of the values associated with the plurality of RF metrics.

7. The device of claim 6, determine a feature importance of respective values associated with the set of RF metrics, associated with the particular device, based on the feature importance of the particular values associated with the plurality of RF metrics associated with the one or more devices,
   wherein the one or more scores are generated further based on the feature importance of the values associated with the set of RF metrics.

8. A non-transitory computer-readable medium, storing a plurality of processor-executable instructions to:
   determine a first set of differences between a plurality of radio frequency ("RF") metrics associated with one or more devices and availability metrics associated with the one or more devices;
   determine a second set of differences between a set of RF metrics associated with a particular device and a first time;
   generate one or more scores based on the first and second sets of differences;
   determine, based on the generated one or more scores, a second time at which to output information to the particular device; and
   output, at the determined second time, the information to the particular device.

9. The non-transitory computer-readable medium of claim 8, wherein the first set of differences include differences between times with which the plurality of RF metrics are associated and times with which the availability metrics are associated.

10. The non-transitory computer-readable medium of claim 8, wherein the second set of differences include a difference between a time with which the set of RF metrics are associated and the first time.

11. The non-transitory computer-readable medium of claim 10, wherein the set of RF metrics associated with the particular device include RF metrics measured by the particular device, wherein the time with which the set of RF metrics are associated includes a time at which the RF metrics were measured by the particular device.

12. The non-transitory computer-readable medium of claim 8, wherein the availability metrics include indications of whether the one or more devices were able to send or receive traffic via one or more networks.

13. The non-transitory computer-readable medium of claim 8, wherein the plurality of processor-executable instructions further include processor-executable instructions to:
   determine a feature importance of respective values associated with the plurality of RF metrics based on differences between the values associated with the plurality of RF metrics and the availability metrics,
   wherein the one or more scores are generated based on the feature importance of the values associated with the plurality of RF metrics.

14. The non-transitory computer-readable medium of claim 13, determine a feature importance of respective values associated with the set of RF metrics, associated with the particular device, based on the feature importance of the particular values associated with the plurality of RF metrics associated with the one or more devices,
   wherein the one or more scores are generated further based on the feature importance of the values associated with the set of RF metrics.

15. A method, comprising:
   determining a first set of differences between a plurality of radio frequency ("RF") metrics associated with one or more devices and availability metrics associated with the one or more devices;
   determining a second set of differences between a set of RF metrics associated with a particular device and a first time;

generating one or more scores based on the first and second sets of differences;

determining, based on the generated one or more scores, a second time at which to output information to the particular device; and outputting, at the determined second time, the information to the particular device.

16. The method of claim 15, wherein the first set of differences include differences between times with which the plurality of RF metrics are associated and times with which the availability metrics are associated.

17. The method of claim 15, wherein the set of RF metrics associated with the particular device include RF metrics measured by the particular device, wherein the second set of differences include a difference between a time at which the RF metrics were measured by the particular device.

18. The method of claim 15, wherein the availability metrics include indications of whether the one or more devices were able to send or receive traffic via one or more networks.

19. The method of claim 15, further comprising:

determining a feature importance of respective values associated with the plurality of RF metrics based on differences between the values associated with the plurality of RF metrics and the availability metrics, wherein the one or more scores are generated based on the feature importance of the values associated with the plurality of RF metrics.

20. The method of claim 19, determine a feature importance of respective values associated with the set of RF metrics, associated with the particular device, based on the feature importance of the particular values associated with the plurality of RF metrics associated with the one or more devices, wherein the one or more scores are generated further based on the feature importance of the values associated with the set of RF metrics.

* * * * *